United States Patent Office 2,779,793
Patented Jan. 29, 1957

2,779,793

PROCESS FOR THE MANUFACTURE OF A POLYENE ALDEHYDE

Otto Isler, Marc Montavon, and Rudolf Rüegg, Basel, and Paul Zeller, Neuallschwil, Switzerland, assignors to Hoffmann-La Roche Inc., Nutley, N. J., a corporation of New Jersey No Drawing. Application July 19, 1954,
Serial No. 444,372

Claims priority, application Switzerland August 14, 1953

7 Claims. (Cl. 260—601)

This invention relates to a process for the preparation of a hitherto unknown polyene dialdehyde, which comprises acetalizing 4:9-dimethyl-dodecatetraen-(2:4:8:10)-yn-(6)-dial-(1:12), condensing the obtained diacetal with a propenyl ether in the presence of an acidic condensing agent, and treating the obtained 2:6:11:15-tetramethyl - hexadecatetraen - (4:6:10:12) - yn - (8) - diether - (3:14) - diacetal - (1:16) with acid to cause hydrolysis and elimination of alcohol from positions 2:3 and 14:15 in order to form the 2:6:11:15 - tetramethyl-hexadecahexaen - (2:4:6:10:12:14) - yn - (8) - dial - (1:16).

The obtained polyene dialdehyde, i. e. 2:6:11:15-tetrametyl - hexadecahexaen - (2:4:6:10:12:14) - yn - (8) - dial - (1:16), hereinafter referred to as $C_{20}$ dialdehyde, is a valuable intermediate for the synthesis of polyene dyestuffs. Thus, when the said $C_{20}$ dialdehyde is reacted with two molecular proportions of methyl alpha-bromoacetate by the Reformatsky method and water is eliminated from the reaction product, dehydromethylbixin is formed from which, after partial hydrogenation of the triple bond and isomerization, all-trans-methylbixin is obtained. By converting both aldehyde groups of the $C_{20}$ dialdehyde into carboxylic groups, dehydrocrocetin is obtained from which crocetin is obtained by partial hydrogenation of the triple bond and isomerization. By acetalizing the $C_{20}$ dialdehyde, condensing the obtained acetal with 2 molecular proportions of an alkyl vinyl ether and treating the condensation product with acid, dehydrobixin dialdehyde is obtained from which bixin dialdehyde is formed by partial hydrogenation of the triple bond and isomerization. By reacting dehydrobixin dialdehyde and bixin dialdehyde with 2 molecular proportions of 2-methyl-6-bromo-hepten-(2) according to Grignard and eliminating water from the reaction products, dehydrolycopene and lycopene, respectively, are obtained.

The starting compound, i. e. 4:9-dimethyl-dodecatetraen-(2:4:8:10) - yn - (6) - dial - (1:12), hereinafter referred to as $C_{14}$ dialdehyde, is obtained as follows:

2:7 - dimethyl - octadien - (2:6) - yn - (4) - dial - (1:8) is acetalized by a known method, e. g. by means of ethyl ortho-formate in the presence of an acidic condensing agent such as ammonium nitrate. The obtained diacetal is then condensed with a vinyl ether, e. g. ethyl vinyl ether in the presence of an acidic condensing agent such as the addition product of $BF_3$ and ether. The obtained 4:9 - dimethyl - dodecadien - (4:8) - yn - (6) - diether - (3:10) - diacetal - (1:12) is treated with acid, e. g. by heating with aqueous phosphoric acid to about 100° C., to cause hydrolysis and elimination of alcohol from positions 2:3 and 10:11. The obtained $C_{14}$ dialdehyde melts at 165° C. and shows two absorption maxima in the ultra-violet spectrum at 371 m$\mu$, $\epsilon$=53,500, and 391 m$\mu$, $\epsilon$=51,700 (in ethanol).

The process according to the present invention comprises three steps. The first step consists in acetalizing the $C_{14}$ dialdehyde to form 4:9 - dimethyl - dodecatetraen-(2:4:8:10) - yn - (6) - diacetal - (1:12), hereinafter referred to as $C_{14}$ diacetal. In the second step the $C_{14}$ diacetal is condensed with a propenyl ether to form 2:6:11:15 - tetramethyl - hexadecatetraen - (4:6:10:12)-yn - (8) - diether - (3:14) - diacetal - (1:16), hereinafter referred to as $C_{20}$ dietheracetal. The third step consists in treating the $C_{20}$ dietheracetal with an acid to form the $C_{20}$ dialdehyde.

The first step of the process according to the present invention, i. e. acetalization of the $C_{14}$ dialdehyde, is carried out by a known method. Thus the acetalization is carried out, for example, by means of an ortho-formate in the presence of an acidic condensing agent such as p-toluene sulfonic acid, phosphoric acid, $BF_3$-ether adduct, $NH_4NO_3$ etc. Ortho-esters of lower aliphatic acids with lower aliphatic alcohols, preferably the methyl, ethyl, or n-butyl ortho-formates, are particularly suitable for this condensation. The obtained acetals of the $C_{14}$ dialdehyde are colorless oils showing two absorption maxima in the ultra-violet spectrum at 330 m$\mu$ and 350 m$\mu$. The acetals can be used for the next step without further purification such as by distillation.

In the second step of the process according to the present invention the $C_{14}$ diacetal is condensed with a propenyl ether in the presence of an acidic condensing agent to form the $C_{20}$ dietheracetal. Condensing agents which can be used for this condensation are the following: $BF_3$-ether adduct, $ZnCl_2$, $TiCl_4$, $AlCl_3$, $SnCl_4$ etc. It is convenient to use the propenyl ether of the same alcohol as is used for acetalizing the $C_{14}$ dialdehyde, e. g. methyl propenyl ether, ethyl propenyl ether or n-butyl propenyl ether. It is advantageous to carry out the condensation at as low a temperature as possible. In this manner undesired side reactions, such as polymerization and condensation of the forming $C_{20}$ dietheracetal with propenyl ether, can be avoided. Depending on the specific condensing agent, $C_{14}$ diacetal and propenyl ether used for the condensation, the optimum reaction temperature is comprised between 25° and 60° C. In the preferred mode of execution of the process two molecular proportions of the propenyl ether are reacted with the $C_{14}$ diacetal at a temperature between 25° and 60° C. in the presence of $BF_3$-ether adduct. In this manner substantially pure $C_{20}$ dietheracetals are obtained in an almost quantitative yield. The obtained dietheracetals can be used for the next step without further purification such as by distillation.

The third step of the process according to the present invention consists in hydrolysing the $C_{20}$ dietheracetals in an acidic medium in a known manner, the $C_{20}$ diacetal being formed with simultaneous elimination of alcohol from positions 2:3 and 14:15. This reaction step is conveniently carried out in the presence of water-insoluble, non-volatile, organic or inorganic acids, such as e. g., p-toluene sulfonic acid, acetic acid, propionic acid, oxalic acid, sulfuric acid, phosphoric acid, or of water-soluble acid salts such as $ZnCl_2$ and $NaHSO_4$. It is advantageous to carry out the reaction in the absence of oxygen and under such conditions that the alcohol being formed during the reaction is continuously removed from the reaction mixture. A water-miscible solvent such as dioxane, tetrahydrofurane, ethylene glycol dimethyl ether, etc., may be added to the reaction mixture in order to obtain a homogeneous mixture. Preferably, the $C_{20}$ dietheracetal is either heated together with aqueous phosphoric acid to about 100° C. in the presence of a water-miscible solvent, the alcohol formed during the reaction being continuously removed from the reaction mixture, or boiled with acetic acid with addition of alkali acetate and some water, the alcohol formed during the reaction being combined in the form of the acetate. On dilution of the reaction mixture with water the crystalline $C_{20}$ dialdehyde precipitates. It may be purified by recrystallization, e. g., from a mixture of benzene and petroleum ether. In order to prevent losses of substance due to polymerization and decomposition it is recommended to avoid temperatures exceeding 120° C. throughout the process and, particularly, to use the intermediates, i. e. the $C_{14}$ diacetal and the $C_{20}$ diacetal, in undistilled form for each subsequent step.

The $C_{20}$ dialdehyde melts at 190 to 192° C. and shows three absorption maxima in the ultra-violet spectrum at 267 m$\mu$, $\epsilon=15,300$, 325 m$\mu$, $\epsilon=15,600$, and 420 m$\mu$, $\epsilon=80,400$ (in ethanol). The diphenyl hydrazone of the $C_{20}$ dialdehyde forms fine red needles (from pyridine) melting at 349° C. (with decomp.).

The present invention is further illustrated but not limited by the following examples in which parts are by weight if not otherwise stated.

EXAMPLE

$C_{14}$ diacetal

To a warm solution of 30 parts of 4:9 - dimethyl-dodecatetraen - (2:4:8:10) - yn - (6) - dial - (1:12) in 100 parts of ethyl ortho-formate is added a warm solution of 2 parts of ammonium nitrate in 100 parts by volume of absolute alcohol, and the mixture is heated for such a period of time that on dilution of the mixture no more crystals of starting material separate. The reaction mixture is then taken up in ether, and the solution is washed with sodium bicarbonate solution and dried over potassium carbonate. After concentration of the ether solution the excess of ethyl ortho-formate as well as the ethyl formate formed in the reaction are separated from the reaction mixture in vacuo. By distilling the reaction product in a high vacuum pure 4:9 - dimethyldodecatetraen - (2:4:8:10) - yn - (6) - tetraethyl - diacetal - (1:12) of B. P. 181° C./0.04 mm. and $n_D^{27°}$ 1.57 is obtained. U. V. maxima: 330 m$\mu$, $\epsilon=46,400$, and 350 m$\mu$, $\epsilon=48,300$ (in ethanol).

$C_{20}$ dietheracetal

To 45 parts of 4:9 - dimethyl - dodecatetraen - (2:4:8:10) - yn - (6) - tetraethyl - diacetal - (1:12) and 0.5 part of $BF_3$-ether adduct 80 parts of ethyl propenyl ether are gradually added with stirring. The rate of addition is so adjusted that the reaction temperature is maintained between 30 and 35° C. Stirring is continued for 3 hours at 35° C., whereupon the reaction mixture is taken up in ether and the solution is washed with diluted sodium hydroxide solution and dried over potassium carbonate. Concentration of the ethereal solution yields the crude 2:6:11:15 - tetramethyl - hexadecatetraen - (4:6:10:12) - yn - (8) - diethoxy - (3:14) - diacetal - (1:16) which shows two absorption maxima in the ultra-violet spectrum at 330 m$\mu$ and 350 m$\mu$ (in ethanol).

$C_{20}$ dialdehyde

For carrying out the saponification the crude 2:6:11:15-tetramethyl - hexadecatetraen - (4:6:10:12) - yn - (8) - diethoxy - (3:14) - diacetal - (1:16) is dissolved in a mixture of 300 parts by volume of dioxane, 60 parts by volume of water and 10 parts by volume of 87% phosphoric acid, and a minute amount of hydroquinone is added. The mixture is boiled under nitrogen for 7 hours, a mixture of dioxane, alcohol and water being distilled off from the reaction mixture through a column packed with Raschig rings. The volume of the reaction mixture is maintained constant by dropping a mixture of dioxane and water into the reaction mixture. The hot reaction mixture is then poured on ice water with stirring, the 2:6:11:15 - tetramethyl - hexadecahexaen-(2:4:6:10:12:14) - yn - (8) - dial - (1:16) then precipitating immediately in a crystalline form. The precipitate is filtered with suction and thoroughly washed with water. The pure dialdehyde having a melting point of 190 to 192° C. is obtained by recrystallization from a mixture of benzene and petroleum ether.

What we claim is:

1. A process for preparing a new polyene dialdehyde, which comprises acetalizing 4:9-dimethyl-dodecatetraen-(2:4:8:10) - yn - (6) - dial - (1:12) with a lower alkyl ortho-formate, condensing the obtained diacetal with a propenyl ether in the presence of an acidic condensing agent at a temperature between 25° and 60° C., and treating the obtained 2:6:11:15 - tetramethyl - hexadecatetraen - (4:6:10:12) - yn - (8) - diether - (3:14) - diacetal - (1:16) with acid to cause hydrolysis and elimination of alcohol from positions 2:3 and 14:15 in order to form the 2:6:11:15 - tetramethyl - hexadecahexaen - (2:4:6:10:12:14) - yn - (8) - dial - (1:16).

2. A process as claimed in claim 1, in which the 4:9-dimethyl - dodecatetraen - (2:4:8:10) - yn - (6) - dial - (1:12) acetalized with a lower alcohol is condensed with the propenyl ether of the same lower alcohol.

3. A process as claimed in claim 1, in which two molecular proportions of propenyl ether are reacted with the diacetal at a temperature between 25° and 50° C.

4. A process as claimed in claim 1, in which the obtained condensation product is heated with phosphoric acid in the presence of a water-miscible solvent, and the alcohol formed in the reaction is continuously removed from the reaction product.

5. A process as claimed in claim 1, in which the obtained condensation product is boiled with acetic acid with addition of alkali acetate and some water.

6. A process as claimed in claim 1, in which temperatures exceeding 120° C. are avoided throughout the process, and the intermediates are used in undistilled form for the further reactions.

7. 2:6:11:15 - tetramethyl - hexadecahexaen - (2:4:6: 10:12:14)-yn-(8)-dial-(1:16).

No references cited.